(12) United States Patent
Banerjee et al.

(10) Patent No.: US 10,244,345 B2
(45) Date of Patent: Mar. 26, 2019

(54) GEOGRAPHIC LOCATION MAPPING USING NETWORK SIGNAL STRENGTH

(71) Applicant: International Business Machines Corporation, Armonk, NY (US)

(72) Inventors: Dipyaman Banerjee, New Delhi (IN); Apurva Kumar, Noida (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 15/296,866

(22) Filed: Oct. 18, 2016

(65) Prior Publication Data

US 2018/0109909 A1  Apr. 19, 2018

(51) Int. Cl.
| | |
|---|---|
| *H04W 4/02* | (2018.01) |
| *H04W 4/021* | (2018.01) |
| *H04W 4/04* | (2009.01) |
| *H04W 48/16* | (2009.01) |
| *G06Q 20/12* | (2012.01) |
| *G06F 17/30* | (2006.01) |

(52) U.S. Cl.
CPC ........ *H04W 4/02* (2013.01); *G06F 17/30345* (2013.01); *G06Q 20/12* (2013.01); *H04W 4/021* (2013.01); *H04W 4/043* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 8,838,481 B2 * | 9/2014 | Moshfeghi | G01S 19/48 705/16 |
| 2013/0189953 A1 | 7/2013 | Mathews | |

(Continued)

OTHER PUBLICATIONS

Rai, Anshul et al., "Zee: Zero-Effort Crowdsourcing for Indoor Localization", MobiCom '12, Aug. 22-26, 2012, Istanbul, Turkey, 12 pages, ACM Digital Library.

(Continued)

*Primary Examiner* — Paul Danneman
(74) *Attorney, Agent, or Firm* — Ference & Associates LLC

(57) ABSTRACT

One embodiment provides a method that performs the steps of collecting network signal information from a sensor of a mobile device located in a designated vendor area. The network signal information is produced by a fixed transmitting device and has a corresponding network time stamp. The mobile device located in the designated vendor area receives a payment notification from a vendor; extracting from the payment notification, time stamp information and a name of the vendor sending the payment notification; and matching the time stamp information with the corresponding network time stamp and automatically updating a labeled localization database. The labeled localization database comprises previously mapped localization information corresponding to multiple spatial zones of the designated vendor area and the updating comprises linking the name of the vendor sending the payment notification with a physical location of the fixed transmitting device. Other aspects are described and claimed.

14 Claims, 3 Drawing Sheets

(56) References Cited

U.S. PATENT DOCUMENTS

2015/0051953 A1 2/2015 Howe
2016/0061607 A1 3/2016 Yang et al.

OTHER PUBLICATIONS

Yang, Zheng et al., "Locating in Fingerprint Space: Wireless Indoor Localization with Little Human Intervention", MobiCom '12, Aug. 22-26, 2012, Istanbul, Turkey, 12 pages, ACM Digital Library.

\* cited by examiner

| Timestamp | AP MAC ID | RSSI Value | Semantic Label | 3D Coordinate |
|---|---|---|---|---|
| 1432824619 | 00:1e:2f:3d:4c:44 | -65 | Restaurant A | 2nd Floor, (137, 248) |
| 1432824619 | 11:ff:5a:32:4a:9d | -78 | Restaurant A | 2nd Floor, (137, 248) |
| 1432824619 | 00:5f:7c:3d:5b:2a | -54 | Restaurant A | 2nd Floor, (137, 248) |

FIG. 2

GEOGRAPHIC LOCATION MAPPING USING NETWORK SIGNAL STRENGTH

BACKGROUND

Many people shop at retailers or eat at nearby restaurants located within a shopping mall or shopping area and pay for the goods or services using many different methods, for example, credit cards, debits cards, mobile wallets, and the like. When a person purchases goods and services, the person may receive a payment notification. For example, a person may receive a printed receipt from the merchant or retailer. As another example, a person may receive an electronic payment notification (e.g., an emailed payment confirmation, a text message including payment information, etc.). The payment notifications, whether as a paper copy or electronic copy, allow shoppers to retain receipts from the merchant or vendor in which the purchase was made. For example, a person can shop inside a mall and make a purchase at a clothing store, such as "Clothing Store A" and receive a payment notification after making a mobile payment using an associated credit card, mobile wallet, or the like.

Additionally, when a person enters a shopping area the user generally carries a mobile device (e.g., cellular phone, smart phone, smart watch, tablet, laptop computer, gaming device, etc.). The mobile device may receive signals from networks, for example, wireless network signals, cellular tower signals, Bluetooth® signals, and the like. The mobile device may also receive information related to the network, for example, signal strength, network identification information, network location, and the like.

BRIEF SUMMARY

In summary, one aspect of the invention provides a method, comprising: utilizing at least one processor to execute computer code that performs the steps of: collecting network signal information from at least one sensor of the at least one mobile device located in a designated vendor area comprising multiple spatial zones, wherein the network signal information of the designated vendor area is produced by at least one fixed transmitting device and has a corresponding network time stamp; receiving, at the at least one mobile device located in the designated vendor area, at least one payment notification from at least one vendor located within the designated vendor area; extracting, from the at least one payment notification, time stamp information and a name of the vendor sending the payment notification; matching, based on the extracting, the time stamp information with the corresponding network time stamp; updating, automatically, a labeled localization database based on the matching, wherein the labeled localization database comprises previously mapped localization information corresponding to the multiple spatial zones of the designated vendor area; and wherein the updating comprises linking the name of the vendor sending the payment notification with a physical location of the at least one fixed transmitting device, wherein the at least one mobile device is locatable within the multiple spatial zones of the designated vendor area based on the network signal information.

Another aspect of the invention provides an apparatus, comprising: at least one processor; and a computer readable storage medium having computer readable program code embodied therewith and executable by the at least one processor, the computer readable program code comprising: computer readable program code that collects network signal information from at least one sensor of at least one mobile device located in a designated vendor area comprising multiple spatial zones, wherein the network signal information of the designated vendor area is produced by at least one fixed transmitting device and has a corresponding network time stamp; computer readable program code that receives, at the at least one mobile device located in the designated vendor area, at least one payment notification from at least one vendor located within the designated vendor area; computer readable program code that extracts, from the at least one payment notification, time stamp information and a name of the vendor sending the payment notification; computer readable program code that matches, based on the extracting, the time stamp information with the corresponding network time stamp; computer readable program code that updates, automatically, a labeled localization database based on the matching, wherein the labeled localization database comprises previously mapped localization information corresponding to the multiple spatial zones of the designated vendor area; and wherein the updating comprises linking the name of the vendor sending the payment notification with a physical location of the at least one fixed transmitting device, wherein the at least one mobile device is locatable within the multiple spatial zones of the designated vendor area based on the network signal information.

An additional aspect of the invention provides a computer program product, comprising: a computer readable storage medium having computer readable program code embodied therewith, the computer readable program code comprising: computer readable program code that collects network signal information from at least one sensor of at least one mobile device located in a designated vendor area comprising multiple spatial zones, wherein the network signal information of the designated vendor area is produced by at least one fixed transmitting device and has a corresponding network time stamp; computer readable program code that receives, at the at least one mobile device located in the designated vendor area, at least one payment notification from at least one vendor located within the designated vendor area; computer readable program code that extracts, from the at least one payment notification, time stamp information and a name of the vendor sending the payment notification; computer readable program code that matches, based on the extracting, the time stamp information with the corresponding network time stamp; computer readable program code that updates, automatically, a labeled localization database based on the matching, wherein the labeled localization database comprises previously mapped localization information corresponding to the multiple spatial zones of the designated vendor area; and wherein the updating comprises linking the name of the vendor sending the payment notification with a physical location of the at least one fixed transmitting device, wherein the at least one mobile device is locatable within the multiple spatial zones of the designated vendor area based on the network signal information.

A further aspect of the invention provides a method, comprising: collecting network signal information from mobile device sensors of a plurality of mobile devices located in a designated vendor area, wherein the network signal information has a corresponding network time stamp; receiving, at the plurality of mobile devices located in the designated vendor area, a payment notification from a vendor located in the designated vendor area; extracting time stamp information and a name of the vendor from the payment notification; and matching the payment time stamp information with the corresponding network time stamp information; populating a labeled localized database using the matching, wherein the labeled localized data base comprises the collected information matched with at least one vendor location in the designated vendor area; and locating a second mobile device in the designated vendor area, wherein the locating of the second mobile device comprises cross-referencing detected network signal information of the second mobile device with the updated labeled localized database to find a vendor name matched with the location of the second mobile device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 illustrates an example subset from a labeled localization database.

DETAILED DESCRIPTION

Figure 1:
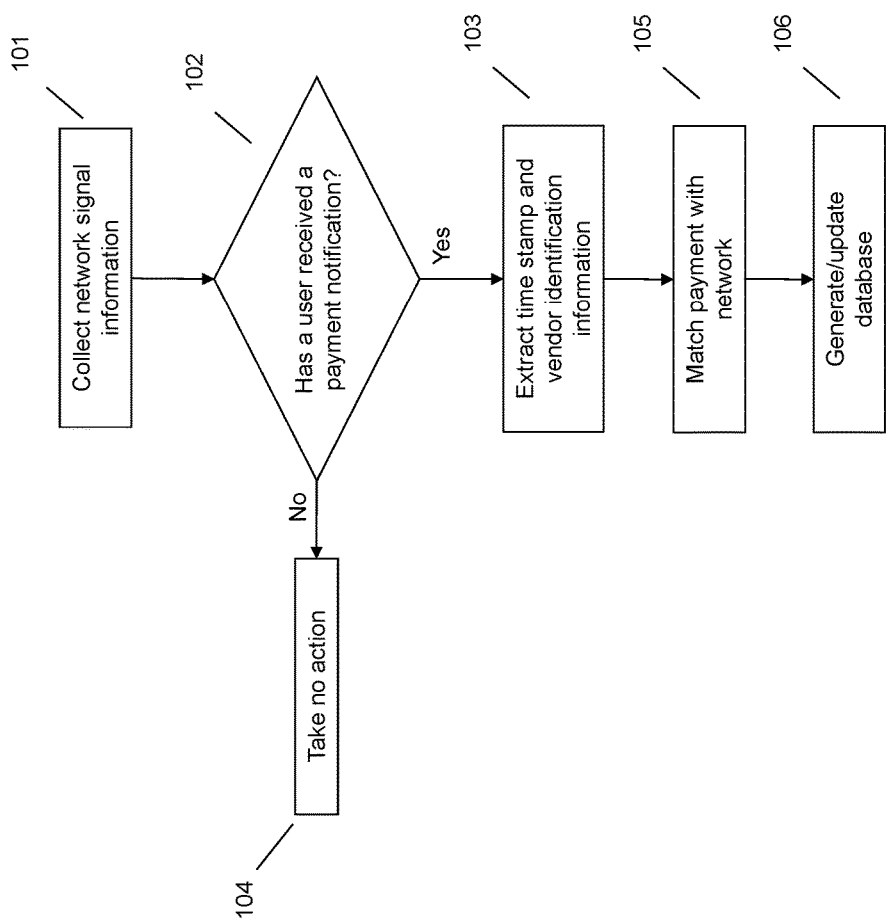
FIG. 1 illustrates a method of collecting network signal information from sensors of a mobile device in a designated vendor area.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Indoor localization fingerprint databases are currently an active field of study. Indoor localization fingerprint databases provide a method of identifying exact locations of different places (e.g., stores, attractions, restaurants, etc.) which may be located within a single building. Outdoor localization techniques (e.g., global positioning systems (GPS), cellular tower triangulation, satellite location positioning, etc.), are not as effective indoors because the walls of the building, roofing materials, and the like, may block the signals. Additionally, outdoor localization techniques may not be as accurate indoors because different merchants or attractions within a building may be located in close proximity to each other and outdoor localization techniques may not have the granularity to distinguish the different merchants or attractions. Localization fingerprint databases are generally generated by dividing the indoor areas (or areas in which GPS system sending and receiving capabilities are not available or utilized, for example, any designated vendor area, which may be an indoor or outdoor or a partially indoor and outdoor facility) into spatial zones and collecting Received Signal Strength Indicators (RSSI) to generate RSSI fingerprints or maps for the spatial zones.

The problem with such an approach to localization mapping is that to update the 3D coordinate system or fingerprint database, the information gleaned from the device sensors currently needs to be updated manually to label the RSSI (Received Signal Strength Indicator) fingerprint with a vendor or attraction name. Accordingly, the information may not be updated frequently and may become stale. Additionally, because the database is manually updated, fingerprint and label information may not be readily available using such methodologies. Currently, RSSI fingerprinting based on indoor localization systems or systems in which GPS information is not useful or readily available requires two manual steps. The first is the collection of the RSSI fingerprint data from predefined zones using smartphone or smart device sensors, and the second is labeling of each piece of RSSI fingerprint information with the corresponding 3D (3 dimensional) coordinates and vendor/attraction information (e.g., vendor name, area name, etc.). These manual updates need to occur at regular intervals so that the database information does not become old or out of date. Some current techniques for updating the database are using dedicated or crowd based resources. However, in many crowd based systems, users often forget to label or can easily mislabel the necessary information for updating the database. In other words, human error can occur. Currently, no global fingerprint database exists for all indoor shopping areas (or shopping areas in which GPS information is not available or useful) and the RSSI fingerprint databases are essentially useless without semantic and three dimensional coordinates to accurately determine shop (vendor) and user location.

Accordingly, an embodiment provides a system and method for generating and automatically updating a labeled localized fingerprint database using payment notification information. Additionally, embodiments provide a system and method that enables the automatic creation and updating of the database using information received from a plurality of users, for example, via a crowd sensing approach which overcomes the many drawbacks of the manual approaches described above. The labeled localized fingerprint database may include coordinates or other location information about a retailer or vendor in an indoor mall or other similar facility which can include, by way of example, an outdoor vendor area in which many people will congregate for the purpose of purchasing goods or services, which is referred to as a designated vendor area, and may also include identification information about a retailer or merchant (vendor) located within this designated vendor area. To generate and/or update the labeled localized fingerprint database, an embodiment may label the database with information from the vendor or merchant located within a designated vendor area such that this area can be more accurately mapped by zone and specific location of each vendor establishment. The designated vendor area, by way of example, may be an indoor mall, an outdoor shopping area, a shopping area that includes both indoor and outdoor facilities combined, and the like.

Furthermore, the labeling of information used for generating or updating the fingerprint database may also include the receipt of a payment notification on the user's mobile device from a vendor located within the designated vendor area to be mapped. By collecting and aggregating multiple sources of sensed or detected information from a plurality of mobile devices, the information can then be used to generate and continually update the RSSI fingerprint database associated with the particular designated vendor area location and used to more clearly map the indoor or outdoor specifications within this zone. The sensed information collected and aggregated from a plurality of mobile devices can also be used to identify the location of a user or a group of users that congregate in this indoor or outdoor designated vendor area for the purpose of purchasing goods or services. The location of a specific or individual user may also be identified by using the information used to generate and continually update the RSSI fingerprint database associated with the aforementioned designated vendor area location.

Since the labeled localized fingerprint database is typically generated for indoor vendor areas (or areas in which GPS information is not easily accessible or utilized) where people can purchase goods or services, the purchasing actions of an individual user and/or shopper and subsequent payment notification over a period of time can provide useful information. For example, the fingerprint database may be updated based upon a user or groups of users shopping at multiple places of business at a designated vendor area (e.g., indoor shopping facility, outdoor bazaar, market, etc.). The person or persons located within the designated vendor area may receive payment notifications, while shopping, that can provide useful information related to the vendor. This information may then be utilized to retrieve merchant or vendor location, user or shopper location, exact time of purchase, and the like. Since the payment notification is related to the user shopping in the designated vendor area, the exact location of a particular merchant or vendor (e.g., shop, store, booth, etc.) can be updated as the user navigates throughout the designated vendor area, for example, by utilizing payment notifications from each vendor or merchant visited by the user in the designated vendor area.

Accordingly, to generate and/or update a labeled localized fingerprint database or a labeled localization database, an embodiment may collect network signal information from sensors of a smart device of a shopper or user located in a designated vendor area. The network signal information may include an identification of the network (e.g., wireless network, cellular network, Bluetooth® network, etc.) that is transmitted by a fixed transmitting device, the signal strength associated with the network, a timestamp of when the network signal was received, and the like. To accurately label the fingerprint database (labeled localization database) with the vendor information an embodiment may leverage information contained within a payment notification received by a person or shopper in the designated vendor area. When a person or shopper receives a payment notification, the system may obtain or receive the payment notification. The system may then extract information from the payment notification, for example, time stamp information, vendor identification information (e.g., store location, vendor name, etc.), and the like. An embodiment may then combine the collected network signal information with the information extracted from the payment notification to generate or update the labeled localized fingerprint database (localization database). In one embodiment this matching may be completed by matching the time stamp from the network signal information with the time stamp of the payment notification.

Such a system provides a technical improvement over current systems for generating or updating localized fingerprint databases by leveraging collected network signal information from sensors of mobile devices belonging to shoppers located in designated vendor areas and information contained within payment notifications. The fingerprint database (labeled localization database) may also be automatically generated or updated by map matching. An embodiment is able to automatically update the vendor location in the localized fingerprint database (localization database) using payment notifications by correlating the payment and time stamp information of the payment notification. Accordingly, the localized fingerprint database (localization database) does not rely on positioning sensors of a user's device, which may be inaccurate or nonfunctioning in certain locations.

Additionally, the system may receive information from multiple users and may parse payment notification information from each of these users to ensure that the database contains the most accurate information. For example, the system may receive information from fifty shoppers and using this information may match this information with the coordinates of each zone, otherwise known as a spatial zone, of the designated vendor area. The spatial zones can indicate floor level in a building containing multiple floor levels or a multi-storied building, for example. The spatial zones can also be areas defined from the localization mapping that may indicate differences of only a few meters. Thus, rather than depending on traditional techniques which must rely on manual updates to the fingerprint database, the system as described herein is able to automatically update the fingerprint or localization database, which greatly improves the efficiency and accuracy of the localization database.

For clarity of understanding, embodiments are described in connection with users or shoppers within the confines of an a designated vendor area (indoor or outdoor) which can further be broken down into more specific zones of the entire facility, as discussed above. However, it should be understood that the embodiments as described herein can be applied to other designated vendor areas, for example, bazaars, concerts, attractions, markets, and the like.

Referring now to FIG. 1, at 101 an embodiment may collect network signal information from sensors of a mobile device (e.g., cellular phone, tablet, gaming system, laptop computer, smart watch, smart phone, etc.), located in designated vendor area, for example, mobile devices of shoppers, employees, and the like. The network signal information (transmitted from fixed transmitting devices) may contain a corresponding time stamp, which may indicate when the user received the network signal. A single mobile device may receive network signals from a plurality of networks and/or network devices simultaneously. For example, a single mobile device may receive network signal information from more than one wireless network, Bluetooth® network, cellular network, and the like. Thus, the network signal information may contain network signal information from a plurality of networks and network types. The network signal information may be received by at least one sensor of a mobile device of the user located in the designated vendor area, for example, Bluetooth® sensor, wireless connection card, cellular network receiver, etc. The collection of this information from multiple shoppers or users may enable the generation of a crowd sensing based localization database. In other words, multiple pieces of signal information from multiple devices may enhance the information in the localized fingerprint database (localization database).

As discussed briefly above, the network signal information may include an identification of the network being detected (e.g., network name, network identification, network address, network location, etc.) and may also include details of the signal strength of the network, for example, as shown in columns 201, 202, and 203 of FIG. 2, which will be described in more detail below. The location of the shopper within a designated vendor area will dictate which networks are accessible by the user's mobile device. Additionally, the signal strength of each network will be dependent on the shopper's location. Thus, locations within a designated vendor area may have a unique Received Signal Strength Indicator (RSSI) fingerprint or map. For example, referring to FIG. 2, a user's device may receive signals (206A, 206B, and 206C) from three different networks, identified by Media Access Control (MAC) addresses 202. The signal strength for each of these networks is identified by the RSSI value 203. Using the fingerprints, the designated vendor area may be mapped or divided into zonal areas or spatial zones which may be as close as a few meters apart. Thus, the location of the user can be identified within a fairly small predefined area using the fingerprint generated from the different networks and signal strength of the networks accessible by the user's device.

In one embodiment, the collection of network signal information may not occur until the system identifies that the shopper is within the designated vendor area. The identification of a designated vendor area may be performed through the use of a geofence. A geofence may be a type of virtual boundary that is established around a particular building or designated vendor area. For example, a geofence may be established around a shopping mall. As a user enters the shopping mall, the parameters of the geofence may indicate to the system that the user has entered the shopping mall. The parameters of the geofence may include identification of the particular designated vendor area contained within the geofence. For example, the geofence may identify the name of the designated vendor area, the location of the designated vendor area, and the like.

At 102 an embodiment may determine whether or not a user has received a payment notification. The system may monitor mobile device notification channels (e.g., text messaging, email messaging, push notifications, etc.) to determine if a user has received a payment notification. The geofence, as described above, may determine when the mobile device notification channels will be monitored. For example, the notification channels may not be monitored until the user enters the designated vendor area as defined by the geofence. The user may also opt-in to allowing the system to monitor for payment notifications. A user may receive a payment notification when the user makes a purchase (e.g., using a credit card, debit card, mobile wallet, electronic payment, cash, etc.) and the payment notification is then electronically generated and provided to the user. The payment notification may be received within seconds of making a purchase. For example, when a user makes a purchase at a coffee shop, the user may opt to receive an emailed receipt. When the receipt is emailed to the user, the system may identify the email message as a payment notification. Each payment notification may be identified with a vendor name, such as "Clothing Store A," and may also indicate the time in which the payment was received. As another example, the same person can walk to another site inside the designated vendor area and have lunch at "Restaurant B" and receive a second payment notification through an emailed payment notification after eating and paying the bill. The subsequent payment notification sent to their email account may again contain the name of the restaurant, "Restaurant B", as well as the exact time the bill was paid.

If an embodiment has not identified a payment notification at 102, an embodiment may take no further action and wait for a payment notification at 104. If, however, a payment notification is received and/or identified at 102, an embodiment may extract different information from the payment notification at 103. The information may include time stamp information included within the payment notification. The time stamp information may include the time of the purchase by the user, the time that the payment notification was received, the time that the payment notification was sent, and the like. The information extracted by the system may also include vendor identification information. Vendor identification information may include a vendor name, vendor location, and the like. To extract the information from the payment notification, the system may parse the payment notification. For example, an embodiment may simply determine that a capital word may be a vendor name. As another example, an embodiment may parse all the words from the payment notification and compare the words with a list of known vendors to identify the vendor name. One embodiment may label, using a semantic labeler, the words with semantic labels to identify the vendor name.

Since users can receive payment notifications from different sources and due to different purchases, for example, online and in-store purchases, one embodiment may determine whether the payment notification corresponds to a vendor within the designated vendor area. One technique for making this determination is through the use of the geofence as described above. For example, the system may determine whether the user is within the designated vendor area as defined by the geofence. The system may then identify any payment notifications received within the designated vendor area as being in-store purchases. In this manner, payment notifications originating from areas outside of this designated vendor area can be sensed and ruled out as pertinent information, providing for the dynamic status updates of the fingerprint (localization) database. However, this may not be completely accurate. Thus, one embodiment may make a comparison of extracted information against known information about the designated vendor area. For example, the system may compare the vendor name against known vendors within the designated area. If the vendor name in the payment notification matches a known vendor, the system may attribute the payment notification to an in-store purchase.

Once the vendor information has been extracted, an embodiment may match the payment time stamp information with the network time stamp information at 105. For example, an embodiment may compare the time stamp included in the payment notification with the time stamps included with the network signal information. An embodiment may also perform map matching to find the 3D coordinates of the vendor. The map matching technique may be performed by comparing the vendor name, or other identification information, to a map of the designated vendor area. The map may include the 3D coordinates of all of the vendor locations within the designated vendor area. Thus, after finding the location of the vendor on the map of the designated vendor area, the system can extract the 3D coordinates of the vendor. As an example, assume that the designated vendor area is an indoor mall and the vendor name is "Merchant A." Once the system has extracted the vendor name "Merchant A" from the payment notification, the system may compare the name "Merchant A" to the map of the indoor mall. After locating "Merchant A" on the map, the system may extract the 3D coordinates of "Merchant A" as labeled or identified from the map of the indoor mall. The 3D coordinates can then be used to update the database.

An embodiment may then use this matched information to generate or update the labeled localized fingerprint database at 106. An embodiment may take the information extracted from the payment notification to complete unknown or update information contained within the localization database. For example, referring to FIG. 2, from the RSSI fingerprints, columns 202 and 203 are known. Due to the fact that the network information and payment notification have been matched, the system can use the information extracted from the payment notification to complete or update the semantic label (e.g., vendor name, etc.) 204. Based upon the indoor map matching, the 3D coordinates 205 of the vendor can be completed or updated. Alternatively, the coordinates of the vendor/merchant 205 may be extrapolated from the network signal information. For example, the system may know the fixed location of network transmitters (e.g., wireless network routers, cellular towers, Bluetooth® transmitters, etc.), and may extrapolate the coordinates from the known location of the transmitters and the identified signal strength as received by the mobile device. In other words, the system may use a form of triangulation to identify an approximate location of the user. Thus, the labeling of the database may include labeling the database with the coordinates of the vendor, the vendor identification, the RSSI fingerprint, and the like.

Using the database, a user's location can be determined by extrapolating information from the network signal information and this information can further be used to localize the whereabouts of new shoppers entering the designated vendor establishment zone or zones as well as identify shopper movement or crowd sensing throughout the designated vendor area or zones. For example, if a user receives a payment notification, the system can extract the vendor information and then compare that vendor information against the database. Using this lookup/cross reference technique, the system can identify the exact location of the user within the designated vendor area. Similarly, a vendor can be identified using the localization database as a lookup. For example, if a user is attempting to determine where a particular vendor is located, the user can perform a search of the known coordinates and, thus, determine which vendor is located at those coordinates. The updated generated localization database can be useful in generating promotional information such as coupons or discounts to the users as they navigate the establishment. For example, if the system identifies that a shopper is in close proximity to a particular store, the system may generate or find coupons associated with that store and provide a notification to the user of the same.

Alternatively, if a user with a mobile device enters the designated vendor area and is connected to or receiving signals from the network but does not make any purchases or receive any payment notifications, the user's location can still be determined using standard RSSI fingerprint based localization techniques. Such a technique can capture RSSI signals from the user's mobile device and cross reference the signals with the labeled RSSI fingerprint database, using machine learning techniques to infer the user's exact location by cross referencing the semantic location and corresponding 3D coordinates associated with the labeled RSSI fingerprint database of the designated vendor area. Receipt of a payment notification by the user is not necessary for user localization within the particular designated vendor area.

Figure 3:
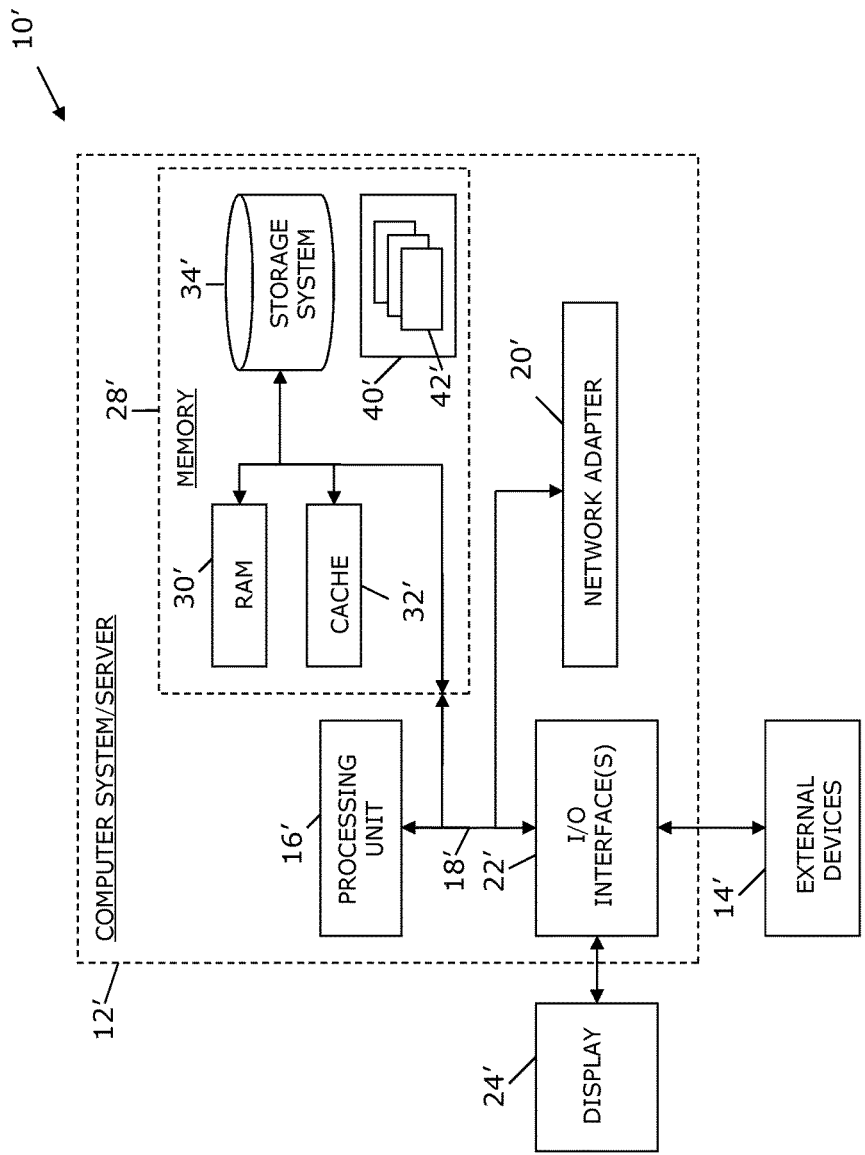
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
collecting network signal information from at least one sensor of at least one mobile device located in a designated vendor area comprising multiple spatial zones, wherein the network signal information of the designated vendor area is produced by at least one fixed transmitting device and has a corresponding network time stamp;
receiving, at the at least one mobile device located in the designated vendor area, at least one payment notification from at least one vendor located within the designated vendor area;
extracting, from the at least one payment notification, time stamp information and a name of the vendor sending the payment notification;
matching, based on the extracting, the time stamp information with the corresponding network time stamp;
updating, automatically, a labeled localization database based on the matching, wherein the labeled localization database comprises previously mapped localization information corresponding to the multiple spatial zones of the designated vendor area; and
wherein the updating comprises linking the name of the vendor sending the payment notification with a physical location of the at least one fixed transmitting device,
wherein the at least one mobile device is locatable within the multiple spatial zones of the designated vendor area based on the network signal information;
wherein the network signal information comprises network signal information from a plurality of networks;
wherein the network signal information comprises an identification of the network;
wherein the network signal information comprises signal strength of the network;
wherein the network signal information includes the location of the network transmitter.

2. The method of claim 1, wherein the collected network signal information comprises receiving signals from a plurality of mobile devices.

3. The method of claim 1, wherein the designated vendor area is identified by a virtual geofence boundary, wherein the geofence boundary comprises predefined virtual geographical parameters.

4. The method of claim 1, wherein the labeled localization database comprises information collected by a plurality of mobile devices for the at least one vendor within the designated vendor area.

5. The method of claim 4, wherein the information comprises the vendor identification information in a map of the designated vendor area.

6. The method of claim 1, comprising determining the location of the at least one mobile device located within the designated vendor area by accessing the labeled localization database.

7. The method of claim 1, wherein the updating comprises using semantic labels of a payment notification received by the at least one mobile device to replace existing semantic labels of a previous version of the labeled localization database.

8. The method of claim 7, wherein the updating comprises refreshing a vendor name within the designated vendor area by replacing an existing vendor name in the labeled localized database.

9. An apparatus, comprising:
at least one processor; and
a computer readable storage medium having computer readable program code embodied therewith and executable by the at least one processor, the computer readable program code comprising:
computer readable program code that collects network signal information from at least one sensor of at least one mobile device located in a designated vendor area comprising multiple spatial zones, wherein the network signal information of the designated vendor area is produced by at least one fixed transmitting device and has a corresponding network time stamp;

computer readable program code that receives, at the at least one mobile device located in the designated vendor area, at least one payment notification from at least one vendor located within the designated vendor area;

computer readable program code that extracts, from the at least one payment notification, time stamp information and a name of the vendor sending the payment notification;

computer readable program code that matches, based on the extracting, the time stamp information with the corresponding network time stamp;

computer readable program code that updates, automatically, a labeled localization database based on the matching, wherein the labeled localization database comprises previously mapped localization information corresponding to the multiple spatial zones of the designated vendor area; and wherein the updating comprises linking the name of the vendor sending the payment notification with a physical location of the at least one fixed transmitting device, wherein the at least one mobile device is locatable within the multiple spatial zones of the designated vendor area based on the network signal information;

wherein the network signal information comprises network signal information from a plurality of networks;

wherein the network signal information comprises an identification of the network;

wherein the network signal information comprises signal strength of the network;

wherein the network signal information includes the location of the network transmitter.

10. A computer program product, comprising:
a computer readable storage medium having computer readable program code embodied therewith, the computer readable program code comprising:
computer readable program code that collects network signal information from at least one sensor of at least one mobile device located in a designated vendor area comprising multiple spatial zones, wherein the network signal information of the designated vendor area is produced by at least one fixed transmitting device and has a corresponding network time stamp;
computer readable program code that receives, at the at least one mobile device located in the designated vendor area, at least one payment notification from at least one vendor located within the designated vendor area;
computer readable program code that extracts, from the at least one payment notification, time stamp information and a name of the vendor sending the payment notification;
computer readable program code that matches, based on the extracting, the time stamp information with the corresponding network time stamp;
computer readable program code that updates, automatically, a labeled localization database based on the matching, wherein the labeled localization database comprises previously mapped localization information corresponding to the multiple spatial zones of the designated vendor area; and wherein the updating comprises linking the name of the vendor sending the payment notification with a physical location of the at least one fixed transmitting device, wherein the at least one mobile device is locatable within the multiple spatial zones of the designated vendor area based on the network signal information;

wherein the network signal information comprises network signal information from a plurality of networks;

wherein the network signal information comprises an identification of the network;

wherein the network signal information comprises signal strength of the network;

wherein the network signal information includes the location of the network transmitter.

11. The computer program product of claim 10, wherein the designated vendor area is identified by a virtual geofence boundary, wherein the geofence boundary comprises predefined virtual geographical parameters.

12. The computer program product of claim 10, wherein the labeled localization database comprises information collected by a plurality of mobile devices for the at least one vendor within the designated vendor area.

13. The computer program product of claim 10, comprising determining the location of the at least one mobile device located within the designated vendor area by accessing the labeled localized database.

14. A method, comprising:
utilizing at least one processor to execute computer code that performs the steps of:
collecting network signal information from mobile device sensors from a plurality of mobile devices located in a designated vendor area, wherein the network signal information has a corresponding network time stamp;
receiving, at the plurality of mobile devices located in the designated vendor area, a payment notification from a vendor located in the designated vendor area;
extracting time stamp information and a name of the vendor from the payment notification;
matching the payment time stamp information with the corresponding network time stamp information;
populating a labeled localized database using the matching, wherein the labeled localized data base comprises the collected information matched with at least one vendor location in the designated vendor area; and
locating a second mobile device in the designated vendor area, wherein the locating of the second mobile device comprises cross-referencing detected network signal information of the second mobile device with the updated labeled localized database to find a vendor name matched with the location of the second mobile device;

wherein the network signal information comprises network signal information from a plurality of networks;

wherein the network signal information comprises an identification of the network;

wherein the network signal information comprises signal strength of the network;

wherein the network signal information includes the location of the network transmitter.

* * * * *